United States Patent Office 3,567,391
Patented Mar. 2, 1971

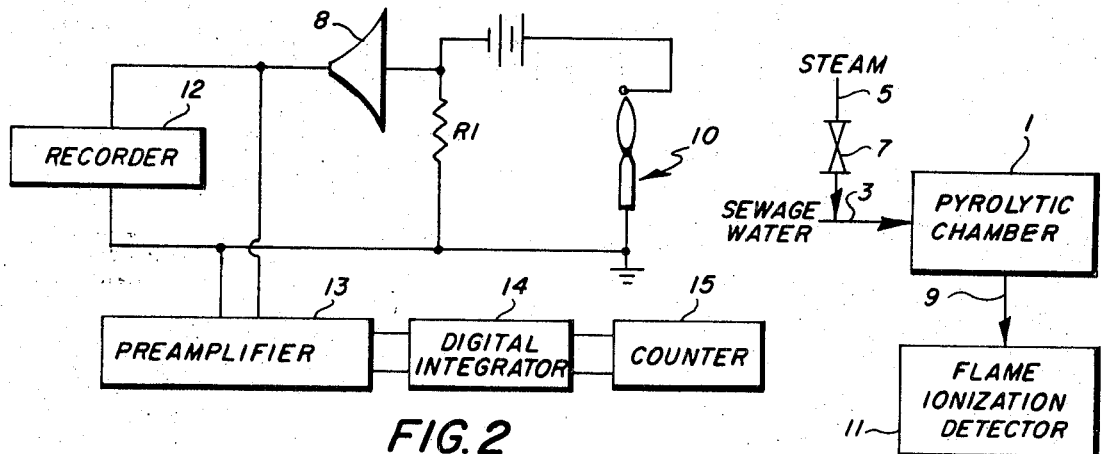
FIG.1
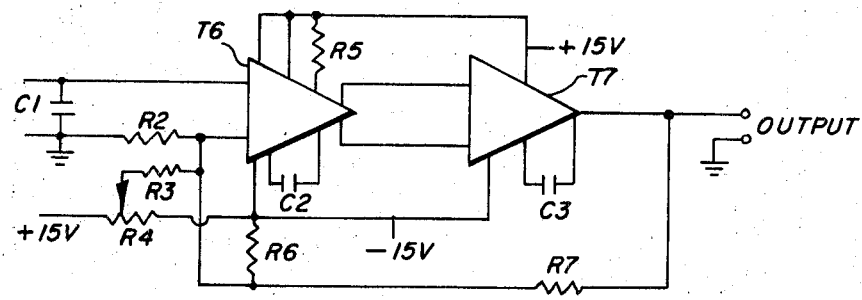
FIG.2
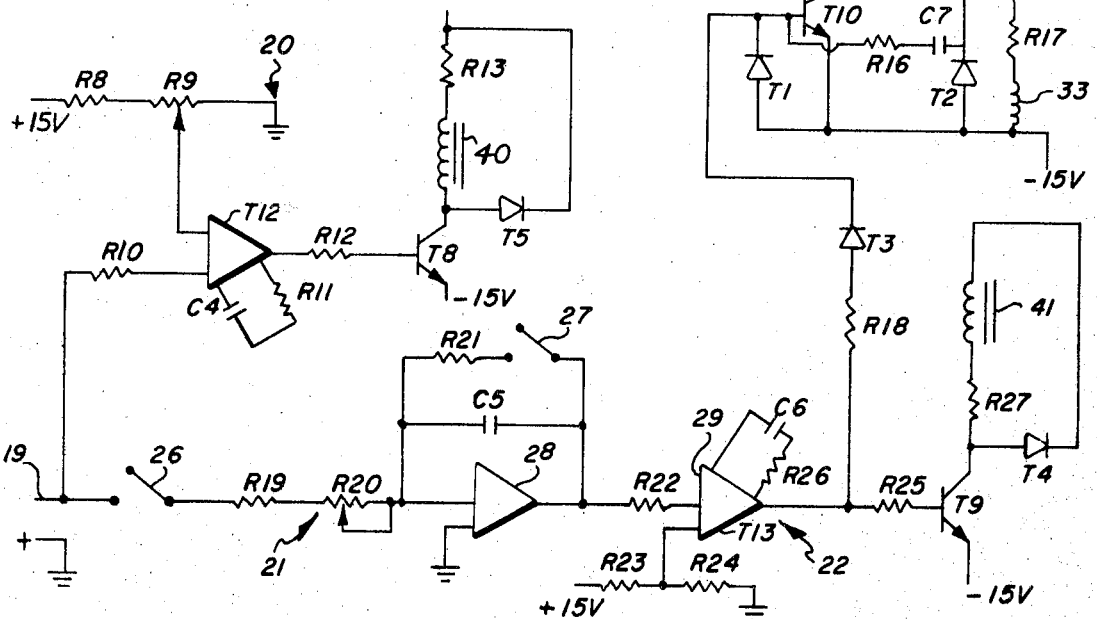
FIG.3
FIG.4
INVENTORS.
IHOR LYSYJ
KURT H. NELSON
BY Thomas S. MacDonald
ATTORNEY

3,567,391
ANALYSIS FOR BIOCHEMICAL OXYGEN DEMAND
Ihor Lysyj, Canoga Park, and Kurt H. Nelson, Thousand Oaks, Calif., assignors to North American Rockwell Corporation
Continuation-in-part of application Ser. No. 672,190, Oct. 2, 1967. This application Sept. 22, 1969, Ser. No. 859,625
Int. Cl. G01n *31/12, 33/18*
U.S. Cl. 23—230                5 Claims

ABSTRACT OF THE DISCLOSURE

A rapid method for the analysis of waste water for biochemical oxygen demand. The method uses a pyrolysis chamber functionally connected to a hydrogen flame ionization detector so that first a value indicative of total organic content of a sample is determined and then that value is converted by suitable factors to a value indicative of biochemical oxygen demand.

REFERENCE TO PRIOR APPLICATION

This is a continuation-in-part of application Ser. No. 672,190, filed Oct. 2, 1967 and now abandoned. The pyrolysis chamber may be that set forth in application Ser. No. 759,969, filed Sept. 16, 1968.

BACKGROUND OF THE INVENTION

In the processing of sewage by the activated sludge process, the effluent from the primary treatment is conventionally treated with air. The addition of air provides oxygen, thereby allowing bacterial action upon degradable wastes, converting the degradable wastes to carbon dioxide and water. The amount of air required to process a given amount of sewage is a function of the concentration of wastes in that sewage and of the type of wastes In the processing of sewage, this addition of air is one of the operational major cost factors and, of course, is a function of the quantity of air needed. Accordingly, the processers should have an accurate analysis of the sewage such that the proper amount of air needed to process the sewage is supplied. One measure of the amount of air needed is the biochemical oxygen demand (BOD). BOD is customarily measured in milligrams of oxygen per liter of water and describes the amount of oxygen needed to biodegrade the biodegradable organic matter in that liter of water.

PRIOR ART

In the prior art, samples of sewage to be analyzed were analyzed for dissolved oxygen, incubated for five days and then analyzed again for dissolved oxygen, giving a direct measure of the respiratory oxygen requirement of bacteria in the sample. This requirement, of course, is the BOD. The major disadvantage of the prior BOD method is the time lapse between sampling and the availability of results and the fact that it is a delicate and sensitive test. Because the test results only show that of the conditions that existed six days ago, personnel must operate the plant through the use of empirical rules and measurement of other parameters. Likewise, the elapsed time does not permit rapid surveillance of fluctuating pollution conditions existing in waterways.

In an attempt to provide immediate analysis of sewage so as to determine the quantity of air needed to degrade the sewage, the prior art has used various methods of carbon analysis to determine the total carbon content of the sewage. In this method, the assumption is made that BOD bears some relation to the total carbon content. However, prior art methods, although accurate as to total organic carbon (TOC) content, have not presented a good correlation with BOD. In general, the best analytical methods in the prior art were only about to achieve a correlation of from $\pm 18$ percent to $\pm 35$ percent at the 95 percent confidence level. A typical example of such a prior art method involves catalytic oxidation of the carbon in the sewage to carbon dioxide and quantitatively measuring the carbon dioxide by an infrared analyzer. There exists a need for an improved method of analysis of sewage water that provides a closer correlation with BOD.

With regard to that part of the hereinafter described apparatus involving a sample flow line, a pyrolysis chamber, sample carrier gas inlet and a flame ionization detector reference is made to the Journal of Gas Chromatography, November 1965, pages 396–398, in the paper by Honaker et al. entitled "A Simple Pyrolyzer for Use with Gas Chromatography."

It is an object of the instant invention to provide an improved method for the determination of BOD of sewage water.

SUMMARY OF THE INVENTION

The method of the instant invention comprises introducing a sample of sewage water to be analyzed into a pyrolysis chamber thereby fractionating the larger organic molecules in the sample to volatile fractions; and subsequently passing this pyrolyzed sample through a flame ionization detector, obtaining a value indicative of BOD and then converting that figure to a value representing the BOD.

BRIEF DESCRIPTION OF THE DRAWING

The invention will be better understood from the following detailed description and drawing in which:
FIG. 1 is a schematic diagram of an apparatus suitable for carrying out the process of the instant invention;
FIG. 2 is a schematic of the conversion system;
FIG. 3 is a schematic circuit diagram of a typical preamplifier; and
FIG. 4 is a schematic circuit diagram of a typical digital integrator.

Referring to FIG. 1, the apparatus includes a pyrolytic chamber 1. A sample conduit 3 is attached to the upstream end of the pyrolytic chamber 1. A steam feed line 5 equipped with a valve 7 is supplied to augment the flow of the sample stream in the conduit 3. The sample, after pyrolysis, travels through the conduit 9 to a flame ionization detector 11 which gives a quantitative reading of the amount of organic carbon present in the sample stream. It has been found to be useful to pass the sample gas through a packed column of glass beads prior to analysis in the flame detector to avoid blowing out the flame. It has also been found to be advantageous to functionally connect the detector to a continuous recorder or to an analog or digital integrator for direct readout.

DESCRIPTION OF PREFERRED EMBODIMENTS

The pyrolytic chamber 1 of the instant invention is of the type known in the prior art. The chamber consists of a simple container heated by suitable means. Such means include, but are not limited to, electric coils and gas flames. The chamber should be of an oxidation resistant material and have a fairly uniform thermal cross-section. Monel metal, Inconel, nickel, and some glasses have been found to be suitable. The chamber should have a fairly uniform thermal cross-section so as to maintain a uniform thermal pyrolysis zone. In practice, a nickel tube filled with nickel turnings has been found to be satisfactory although empty tubes have been used. The chamber contains a heated volume that contains an atmosphere incapable of oxidizing carbon compounds. When the temperature in the chamber is sufficiently high, enough thermal energy is present to break chemical bonds, and hence to "crack" large organic molecules to volatile organics. Temperatures of from 400° C. to 1000° C. are useful in the operation of these chambers, although temperatures of from 600° C. to 800° C. are preferred. A preferred form of pyrolysis chamber is seen in application Ser. No. 759,969, filed Sept. 16, 1968.

A measured sample of sewage solution which typically may be raw sewage or primary treatment effluent is introduced to the pyrolytic chamber 1 by conduit 3. The sample can be introduced on a continuous flow basis from a main source such as a flowing sewage water treatment stream, or can be introduced in a single slug. In the latter case, it is frequently found to be desirable to precede and follow the sample with steam from conduit 5 admitted through valve 7. This steam provides a driving force to move the sample through the system. In the chamber, the large organic molecules are cracked, and the contained water is converted to steam. This steam supplements the aforementioned driving force. Accordingly, all conduits in the apparatus should be heated to prevent condensation.

Using the steam driving force, the now volatile organic constituents of the sewage sample are introduced through a conduit 9 into a flame ionization detector 11. An inert gas such as nitrogen or steam may be used as a carrier for the sample. This detector is of the type known in the prior art and is capable of giving a quantitative measure of the organic carbon in its inlet stream and hence in the sewage sample. These devices are based upon the detection of the increased electrical conductivity in a hydrogen flame detector when an organic gas or vapor is given access to the flame. A quantitative measurement of this increase in conductivity readily leads to a quantitative measurement of the amount of organic material introduced to the flame and hence present in the sample. A typical method of measurement is by continuously recording the output of the ionization detector and subsequently measuring by planimeter the area of the peaks produced by fluctuations in electrical conductivity of the flame.

The measurement of the actual BOD value can also be obtained by employing an analog or digital integrator connected to the output of the ionization detector. FIG. 2 shows a typical overall digital system for integrating the output. The ionization detector 10 has a current output proportional to the number of ions of organic material in the sample. A resultant current is converted to a voltage by standard current reading electrometer containing a shunt R1 and amplified by conventional voltmeter amplifier 8 and fed either to a recorder 12 or to an integrating circuit including a pre-amplifier 13, digital integrator 14 and counter 15 which gives a direct readout in BOD units. The pre-amplifier will generally bring the signal from a less than one millivolt level to a 0.01–1 volt level required by the integrator. The pre-amplified signal controls a comparator circuit which starts and stops the integration function depending upon the setting of the control. The integration is performed by an operational amplifier. The integrator is reset periodically by a comparator circuit and at each reset the counter circuit is triggered showing the BOD reading at that instant.

FIG. 3 is a schematic of a typical D.C. transistor preamplifier circuit. The D.C. pre-amplifier consists of a temperature controlled differential amplifier stage and a second stage which is an operational amplifier. The low drift is achieved by the first stage and the second stage supplies needed gain. The differential amplifier has a very high input impedance and the operational amplifier provides needed gain. R6 is selected to provide the main offset voltage compensation so that the adjustment of R4, the zero adjust, is not too sensitive. R5 is selected to maintain the temperature of the temperature controlled chip above any expected ambient temperature. Component values are listed in Table A.

TABLE A
(R values in ohms; C values in microfarads)

| | | | | |
|---|---|---|---|---|
| R2—100 | R10—470 | R19—100k | C1—.01 | T1—1N485 |
| R3—3M | R11—30 | R20—100k | C2—.05 | T2—1N645 |
| R4—100k | R12—18k | R21—22 | C3—0.00005 | T3—1N455 |
| R5—2k | R13—510 | R22—5.1k | C4—.01 | T4—1N485A |
| R6—250k | R14—1k | R23—10k | C5—.01 | T5—1N485 |
| R7—100k | R15—1.8k | R24—10k | C6—.005 | [1]T6—μa727B |
| R8—150k | R16—6.2k | R25—18k | C7—1.0 | [1]T7—μa741C |
| R9—1k | R17—68 | R26—47 | | T8—2N4400 |
| | R18—10k | R27—470 | | T9—2N4400 |
| | | | | T10—2N2270 |
| | | | | T11—2N5194 |
| | | | | T12, T13—μa739 |

[1] Fairchild.

FIG. 4 is a schematic of a typical digital integrator which includes an automatic start-stop control section 20, an integrator section 21, a comparator section 22 and a counter driver 23. The signal from the pre-amplifier input 19 goes to the automatic start-stop circuit 20 which comprises an operational amplifier T12 and a level set circuit. The operational amplifier T12 is connected as a voltage comparator. When the signal exceeds the set point as determined by R9, the comparator changes state causing reed relay 40 to operator causing contact 26 to close. When this occurs the integrator 21 starts to function and accumulates a charge in C5 until the voltage at the input of operational amplifier 29 (T13), which is also connected as a comparator, senses that the voltage has reached 7.5 volts as determined by the voltage dividers R23 and R24. The circuit then changes state causing reed relay 41 to operate. Contact switch 27 then closes discharging C5 through R21 and integrator 21 starting the function again. When the change of state occurs at the output of operational amplifier 29 a pulse is sent to the counter driver 23 causing it to change state and operate counter 33. Since counter driver 23 is connected as a monostable multivibrator, it remains on for a period of time (between 20 and 30 milliseconds), sufficient to operate the counter even though the input pulse has disappeared. The period of the multivibrator is determined by R16 and C7. Operational amplifier 28 may be a field effect transistor amplifier KM47C made by K & M Electronics.

It has been unexpectedly found that when the method of analysis of the instant invention is used, the correlation between organic carbon as analyzed by the hydrogen flame ionization detector and the BOD as measured by conventional means is within ±5 percent. Typically, results within ±3 percent at the 95 percent confidence level are achieved.

An example of an analysis using the proceduer of the instant invention follows:

EXAMPLE

After assembling the equipment, the sample injector is disconnected and the Swagelok reducer on the pyrolysis chamber is capped. The apparatus is cleaned by purging overnight with steam at 10 p.s.i.g. while the packed column and pyrolysis chamber are maintained at 300° C. and 800° C., respectively. Then the flow is interrupted momentarily for connection of the sample injector to the pyrolysis chamber, and the column is cooled to the operating temperature.

The sample injector is cleaned while it is disconnected from the chamber. The cleaning is accomplished in a two-step operation. First, distilled water is drawn from an aluminum foil-closed 25 cc. flask through the intake tubing of the injector into the syringe. Then the water is expelled from the syringe through the tubing which connects to the chamber. After this sequence is repeated several times, the injector is connected to the chamber. This cleaning technique is also used between each sample and solution during analyses. At these times, the sample or solution to be analyzed is used in place of the distilled water to flush the injector.

During operation, the following instrumental conditions are used:

| | |
|---|---|
| Pyrolysis temperature, °C. | 800 |
| Column temperature, °C. | 125 |
| Heating tape temperature, °C. | 125 |
| Hydrogen, cc./min. | 25 |
| Air, cc./min. | 250 |
| Steam, cc./min. | 16 |
| Attenuation (Aerograph 600–C Chromatograph) | 4 x 1, 8 x 1, 32 x 1 |
| Chart speed, inches/min. | 2 |
| Sample size, cc. | 0.25 |

The blank is determined by injecting 0.25 cc. volumes of distilled water into the pyrolysis chamber. Volatile pyrolytic products and water vapor are carried by the steam through the flow stabilization column to the flame ionization detector for measurement of the organic fragments. Injections are made at six minute intervals to obtain four or five pyrograms for area measurement.

The sample injector is then flushed with the calibration solution, and measured volumes (0.25 cc.) of the solution are pyrolyzed in the same manner as the distilled water. Then the first sewage sample is used to flush the injector before analyzing the sample by the pyrographic technique.

Once the described procedure has been used to analyze for organic matter, the resulting figure must be related or converted to a BOD value. It can be readily seen that the figure derived by the process of the instant invention, the pyrographic BOD, will differ from the actual BOD of the sample in that non-biodegradable organic matter will be included in the pyrographic analysis. However, carbon from carbon dioxide and dissolved carbonates in the sewage will not be analyzed by the instant process since the hydrogen flame detector is not sensitive to carbon-oxygen bonds.

Fortunately, the typical percentage of biodegradable matter compared to total carbonaceous waste in municipal sewage does not vary greatly for a given municipal source. Further, biodegradable wastes comprise a very large percentage of total carbonaceous wastes in most municipal sewage. Accordingly, the pyrographic BOD, when multiplied by some number usually close to one will give the actual BOD.

The conversion factor of the instant invention can be readily arrived at by performing comparative analyses of a sample from the source in which the system is to be used by both the incubation method, previously referred to, and by the method of the instant invention. A comparison of these methods will yield a figure which, as mentioned above, is a rather constant difference. This conversion factor can, if desired, be recomputed from time to time. Table B shows various comparison runs using raw sewage and primary treatment effluent.

Alternatively, the difference in actual BOD and pyrographic BOD can be determined for a number of samples of differing concentration. These figures can then be graphed, giving a more accurate correction than the assumption of a single factor for all concentrations.

Yet another method of calibration involves the use of a glutamic acid and glucose standard. In this method, a test solution containing 150 mg./l. each of glucose and glutamic acid in distilled water is prepared. The biochemical oxygen demand of this solution is determined on several aliquots according to the standard procedure. This procedure is outlined in Standard Methods for the Examination of Water and Wastewater, 12th Edition, American Public Health Association, New York, N.Y. The organic carbon content of a test solution containing exactly 150 mg./l. each of glucose and glutamic acid is 121.2 mg. C/l. The BOD test is preferably conducted initially when instituting the pyrographic procedure and occasionally thereafter.

Using a recorder connected to the flame ionization detector, the average peak areas for the calibration solutions, samples, and distilled water are determined by planimetry. Then, the organic content of a sample is calculated by means of the equation:

$$O_s = O_c \times \frac{A_s}{A_c - A_w}$$

where:

$O_s$ = Organic carbon content of the sample, mg. C/l.
$O_c$ = Organic carbon content of the calibration solution, mg. C/l.
$A_s$ = Average peak area of the sample, cm.$^2$ at attenuation 1
$A_c$ = Average peak area of the calibration solution, cm.$^2$ at attenuation 1
$A_w$ = Average peak area of the distilled water, cm.$^2$ at attenuation 1

The biochemical oxygen demand (BOD) of the sample is then calculated with the equation:

$$BOD_s = BOD_t \times \frac{O_s}{O_t}$$

where:

$BOD_s$ = Biochemical oxygen demand of the sample, mg./l.
$BOD_t$ = Biochemical oxygen demand of the glucose-glutamic acid test solution, mg./l.
$O_s$ = Organic carbon content of the sample, mg. C/l.
$O_t$ = Organic carbon content of the test solution, mg. C/l.

TABLE B

| Sample | Organic content, mg. carbon/liter | Organic load, mg./liter | BOD classical, mg./liter | Difference, percent |
|---|---|---|---|---|
| Raw sewage—Run No.: | | | | |
| 1 | 181 | 257 | 252 | 2.0 |
| 2 | 206 | 292 | 276 | 5.8 |
| 3 | 182 | 258 | 246 | 4.9 |
| 4 | 227 | 322 | 300 | 7.3 |
| 5 | 186 | 264 | 258 | 2.3 |
| Primary treatment effluent—Run No.: | | | | |
| 6 | 106 | 151 | 148 | 2.7 |
| 7 | 127 | 180 | 180 | 0.0 |
| 8 | 148 | 210 | 204 | 2.9 |
| 9 | 150 | 213 | 198 | 7.6 |
| 10 | 137 | 195 | 174 | 12.1 |

We claim:

1. The method of analyzing sewage for biochemical oxygen demand which comprises:
   passing a sample of said sewage into a pyrolysis chamber and fractionating the larger organic molecules in said sample to volatile organic fractions;
   subsequently passing the pyrolyzed sample through a flame ionization detector and obtaining from said detector a current output indicative of organic carbon species in said sample ionized in said detector;
   deriving from said current output a signal proportional to biochemical oxygen demand; and
   converting said signal to a value representing biochemioxygen demand.

2. The method set forth in claim 1 in which the conversion step includes integrating peak areas resulting from the signal from the detector to obtain the value representing biochemical oxygen demand.

3. The method set forth in claim 1 in which the pyrolysis chamber is heated to a temperature of from 400 to 1000° C.

4. The method set forth in claim 3 in which the pyrolysis chamber is heated to a temperature of from 600 to 800° C.

5. The method set forth in claim 1 in which steam is used as a carrier gas for the sample.

References Cited

UNITED STATES PATENTS 3,169,389  2/1965  Green, Jr. et al. __ 23—232CUX

MORRIS O. WOLK, Primary Examiner

R. M. REESE, Assistant Examiner

U.S. Cl. X.R.

23—232, 253